H. W. BEINS & L. BALTZER.
Combined Bungs and Vent-Valves.
No. 156,971. Patented Nov. 17, 1874.
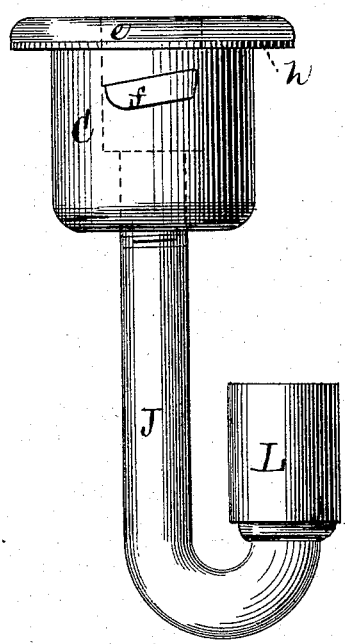
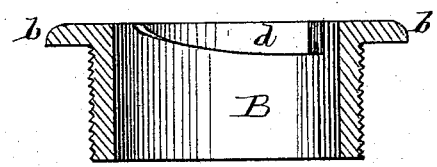
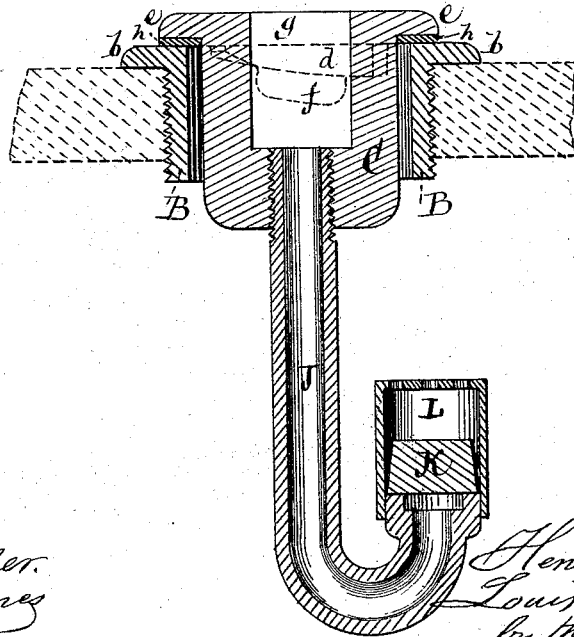

UNITED STATES PATENT OFFICE.

HENRY W. BEINS AND LOUIS BALTZER, OF NEW YORK, N. Y.

IMPROVEMENT IN COMBINED BUNG AND VENT-VALVES.

Specification forming part of Letters Patent No. 156,971, dated November 17, 1874; application filed October 9, 1874.

*To all whom it may concern:*

Be it known that we, HENRY W. BEINS and LOUIS BALTZER, both of the city, county, and State of New York, have invented a Combined Bung and Vent-Valve, of which the following is a specification:

Our invention relates to certain improvements, whereby the bung is readily inserted in place in the barrel, and as readily removed, and whereby, also, provision is made for the admission of air to the barrel on the occurrence of a partial vacuum therein; and to this end the invention consists of a socket for insertion into the bung-hole of the barrel, having internal sectional screw in a tube having a long and a short arm to form a siphon, the long arm of the same being inserted into the central passage of the detachable bung, and the short arm being provided with a valve, and a perforated cap within which the valve operates, as will be hereinafter described.

In the accompanying drawing, Figure 1 is a side view of the combined bung and vent-valve. Fig. 2 is a vertical section of the socket. Fig. 3 is a vertical section of the socket, bung, and vent-valve.

The socket B is of cylindrical form, with a flange, $b$, around its upper or outer edge. It is inserted in the bung-hole so that the flange $b$ will lie close to the stave; and it may be secured in place by a screw-thread, or in any other suitable manner. On the inner surface of the socket B, diametrically opposite each other, are two sectional screw-threads or inclined ribs, $d$. The bung C is cylindrical in form, and slightly smaller than the socket B. On its periphery, diametrically opposite each other, are two projections or lugs, $f f$, the upper sides of which are inclined in a direction parallel with the pitch or line of inclination of the screw-threads or ribs $d$. Around the upper or outer edge of the bung is a flange, $e$, similar to the flange $b$ on the socket B. In the center of the outer end of the bung is a recess, $g$, for the reception of a suitable tool for turning it. The bung is placed in position in the socket by inserting it, with the projections or lugs $f$, between the ends of the threads or ribs $d$, an elastic packing or gasket, $h$, being placed between the flange $e$ and the outer edge of the socket. The bung is then pressed down until the flange $e$ fits closely against the gasket $h$, when it is turned to the right, so as to cause the lugs $f$ and ribs $d$ to engage with each other after the manner of a screw-thread, as shown in dotted lines in Fig. 3, and clamp the bung tightly in its contact with the socket. By reversing the movement the bung may be readily removed from the socket. If desired, the gasket $h$ may be dispensed with and the flanges formed with a ground joint.

In the lower or inner end of the bung is an opening somewhat smaller in diameter than the recess $g$, but communicating therewith. In this opening is inserted, by a screw-thread, or otherwise, the upper end or long arm of a curved tube or inverted siphon, J, the lower end or short arm of which serves as a seat for a valve, K, consisting of a block, pad, or disk, of rubber or other suitable elastic or yielding substance, which rests upon said seat, so as to close the end of the tube. The valve is slightly conical or tapering, and works in a cylindrical cap, L, which fits over the seat and forms a valve-chamber. The top of the cap L is perforated, so as to allow the passage of gas or air through the chamber; and the valve K is slightly smaller in diameter than the cap, so as to allow it to work freely therein, and also to allow the passage of air around its periphery.

When the cask contains a pressure of gas the valve K is pressed closely down upon its seat, and effectually prevents the escape of gas. When a partial vacuum occurs in the cask the air from without rushes through the tube J, raising the valve K from its seat and passing around it and through the perforated chamber into the cask.

What we claim as new, and desire to secure by Letters Patent, is—

The siphon-tube J, having its long arm inserted in a passage through the bung, and having on the extreme end of its short arm the valve K, and perforated cap L, in which the valve operates, as and for the purpose described.

H. W. BEINS.
LOUIS BALTZER.

Witnesses:
MICHAEL RYAN,
BENJAMIN W. HOFFMAN.